United States Patent [19]

Merensky

[11] Patent Number: 4,969,509
[45] Date of Patent: Nov. 13, 1990

[54] AIRPLANE

[75] Inventor: Harald Merensky, Hamburg, Fed. Rep. of Germany

[73] Assignee: Deutsche Lufthansa Aktiengesellschaft, Cologne, Fed. Rep. of Germany

[21] Appl. No.: 329,000

[22] Filed: Mar. 27, 1989

[30] Foreign Application Priority Data

Apr. 16, 1988 [DE] Fed. Rep. of Germany ....... 3812739

[51] Int. Cl.$^5$ .......................... F25D 1/00; B64D 13/08
[52] U.S. Cl. .................................. 165/41; 165/104.34;
62/239; 62/DIG. 22; 244/163
[58] Field of Search .......................... 62/239, DIG. 22;
165/41, 104.34; 244/163

[56] References Cited

U.S. PATENT DOCUMENTS

| 2,499,736 | 3/1950 | Kleen | 62/240 |
| 2,511,876 | 6/1950 | Protzeller | 62/239 |
| 4,739,823 | 4/1988 | Howard | 165/41 |

FOREIGN PATENT DOCUMENTS 887267 8/1943 France ................................. 165/41

*Primary Examiner*—Albert W. Davis, Jr.
*Attorney, Agent, or Firm*—Diller, Ramik & Wight

[57] ABSTRACT

In the airplane of the present invention, a part of the outer skin (10) is not provided with an insulating layer (11). A cold air chamber (13) is provided behind this part being in heat exchange with the ambient air via the outer skin (10). A flow-in duct leads from the cold air chamber (13) to the cooling chamber (16) and a flow-out duct (21) leads from the cooling chamber (16) back to the cold air chamber (13). The cold air chamber (13) and the cooling chamber (16) form a closed recirculation system, thereby cooling the cooling chamber (16) suited for receiving a service trolley (29). A thermostat (25) controls air quantity regulating valves (22;24) and a van (23) in order to maintain a desired temperature within the cooling chamber (16).

20 Claims, 1 Drawing Sheet

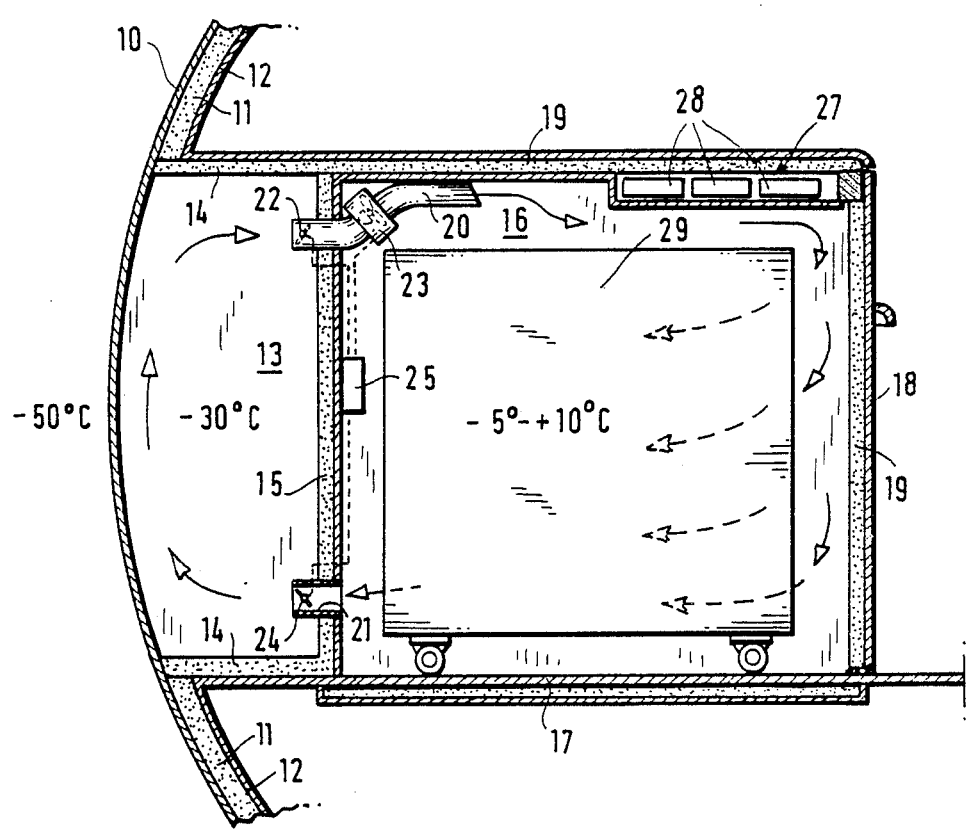

AIRPLANE

The invention relates to an airplane.

The outer skin of airplanes has its inner side provided with an insulating layer of heat-insulating material in order to keep out the extremely low outside temperatures occurring in great flying altitudes. On the other hand, it is necessary to keep previously prepared food and beverages for the passengers cool inside a plane. This cooling is either achieved by using cooling aggregates fed by the power system of the plane, or by using dry-ice. A power supplied cooling system increases the weight of a plane and requires expensive aggregates. Dry-ice cooling, on the other hand, requires considerable work and is troublesome.

It is an object of the present invention to facilitate the cooling of food and beverages, as well as of other goods in a plane.

According to the present invention, a cold air chamber is provided behind the outer skin of a plane, which is in heat exchange with the ambient air that is very cold in great flying altitudes. Air from the inside of the plane is cooled in this cold air chamber at the outer skin by heat exchange. This air is lead into a cooling chamber holding the goods to be cooled. This allows to use the low temperature of the ambient air to cool the cooling chamber without ambient air entering the cooling chamber directly. Using a cooling chamber that is arranged behind the outer skin does neither interrupt nor change the outer skin in any way, so that the flying qualities of the plane are not impaired. Only a portion of the outer skin is used as a heat exchange area. The inner pressure of the plane prevails in the cold air chamber and in the cooling chamber, so that these chambers are a part of the interior of the plane with regard to the pressure therein, while their temperature is influenced by the outside. Both chambers form a recirculating air system, in which the quantity of air circulates, when the door of the cooling chamber is in a closed condition, and in which system the air is cooled in the cold air chamber, while, in the cooling chamber, it transmits coldness to the goods to be cooled.

In a preferred embodiment of the present invention, a temperature adjusting device is provided that controls the air delivery ratio of the recirculation system such that the temperature prevailing within the cooling chamber is kept on a desired constant temperature value. Should the temperature rise above this desired value, the flow rate of the circulated air is increased, resulting in an intensified cooling in the cooling chamber. If, on the other hand, the temperature in the cooling chamber should drop below a desired value, the circulation of air is reduced, so that less coldness is transmitted from the cold air chamber to the cooling chamber. Valves, e.g., ventilators or fans, may be used as actuators in the control system.

The cooling chamber should be heat-insulated from the inner space of the plane. A further heat-insulation may be provided between the cold air chamber and the cooling chamber.

To bridge the time on the air-field, during which the air in the cold air chamber warms up and the exchange of air between the cold air chamber and the cooling chamber has to be stopped, the cooling chamber is preferably provided with a coldness accumulator. This coldness accumulator may contain, e.g., a fluid or a gel of high coldness capacity.

The cooling device according to the present invention is particularly suited for passenger planes and the cooling chamber is preferably suited to receive at least one serving trolley. However, the cooling device may also be used in freight planes in order cool a larger cargo hold for storing perishable goods.

Advantageously, the cooling chamber is arranged directly adjacent to the cold air chamber and separated therefrom only by one single wall. However, the principle of the invention also allows the cooling chamber to be distantly arranged from the cold air chamber and to connect both chambers by a flow-in duct and a flow-out duct.

The following is a detailed description of an embodiment of the present invention with reference to the only Figure in the drawing.

The drawing illustrates a vertical section of a part of the fuselage of a plane.

The plane is provided with a metal outer skin 10, behind which an insulating layer 11 of heat-insulating material is arranged. Behind the insulating layer 11, i.e., on the inside of the plane, the inner fairing 12 is provided.

A part of the outer skin 10 is not provided with the insulating layer 11 in order to form a cold air chamber 13. The air contained in cold air chamber 13 is in heat exchange with the ambient air of the plane via the heat-conductive outer skin 10. Cold air chamber 13 is thermally insulated against the inside of the plane by insulating layers 14. A further insulating layer 15 separates cold air chamber 13 from the cooling chamber 16. At the bottom, cooling chamber 16 is defined by an intermediate bottom 17 of the plane and provided with a door 18 that opens towards the inside of the plane. All walls of cooling chamber 16, including door 18, are lined with heat-insulating layers 19.

A flow-in duct 20 extends from cold air chamber 13 into the upper portion of cooling chamber 16 and a flow-out duct 21 extends from the lower portion of cooling chamber 16 into cold air chamber 13. The flow-in duct 20 is provided with an air quantity regulating valve 22 and a fan 23; the flow-out duct 21 is provided with an air quantity regulating valve 24. Air quantity regulating valves 22 and 24 and the fan 23 are controlled by a thermostat 25 arranged in the cooling chamber 16. The control lines are indicated by broken lines.

The upper wall of cooling chamber 16 is provided with a coldness accumulator 27 having a plurality thermally chargeable coldness accumulator elements 28.

The drawing shows an example of the temperatures outside the plane and inside both chambers 13 and 16. At a temperature of −50° C. on the outside, the temperature inside cold air chamber 13 is −30° C. By controlling the quantity of air flowing through flow-in duct 20 and flow-out duct 21, an optional temperature in the range between −5° C. and +10° C. can be constantly maintained in cooling chamber 16.

The air cooled in cold air chamber 13 is sucked in by the fan 23 and blown into the upper portion of cooling chamber 16 via flow-in duct 20. The air leaves cooling chamber 16 via flow-out duct 21 leading back to cold air chamber 13. Thus, cold air chamber 13 and cooling chamber 16 form a closed air recirculation system in which the internal pressure of the plane prevails. Upon reaching the desired temperature in cooling chamber 16, the thermostat 26 switches off the fan 23 and closes air quantity regulating valves 22,24. The coldness accumulator 27 prevents a quick rise in temperature in the cooling chamber 16 in case the outer temperature of the plane is too high, thus allowing to bridge times on the air field without the temperature in the cooling chamber rising to undesired degrees. During the flight, the cold accumulator 27 is recharged.

The cooling chamber 16 is dimensioned such as to be able to receive at least one serving trolley 29 having shelves for storing meals or beverages.

What is claimed is:

1. An airplane cooling system for cooling a cooling chamber accessible to a passenger compartment and within which perishable food products are adapted to be stored during flight comprising an outer skin defining an interior pressurized compartment, means within said interior pressurized compartment and adjacent a portion of said outer skin for defining therewith a cold air chamber adapted to be maintained relatively cold by cold temperature conduction from exterior ambient air through said outer skin portion, means within said interior pressurized compartment and remote from said outer skin portion for defining a cooling chamber, means for circulating air between said cold air and cooling chambers, means for regulating the air circulation between said cold air and cooling chambers to maintain a desired temperature in said cooling chamber, and means for effecting access between said cooling chamber and a passenger compartment of said interior pressurized compartment to thereby introduce or remove perishable food products relative to said cooling chamber.

2. The airplane cooling system as defined in claim 1 wherein said cold air chamber is relatively uninsulated relative to exterior ambient air.

3. The airplane cooling system as defined in claim 1 wherein said circulating means are a plurality of openings in a common wall between said cold air and cooling chambers.

4. The airplane cooling system as defined in claim 3 wherein said circulating means includes a fan.

5. The airplane cooling system as defined in claim 3 including means for insulating said cooling chamber relative to said cold air chamber, and said insulating means include a common insulated wall between said cold air and cooling chambers.

6. The airplane cooling system as defined in claim 1 wherein said circulating means are a plurality of ducts between said cold air and cooling chambers.

7. The airplane cooling system as defined in claim 6 wherein said circulating means includes a fan.

8. The airplane cooling system as defined in claim 6 including means for insulating said cooling chamber relative to said cold air chamber, and said insulating means include a common insulated wall between said cold air and cooling chambers.

9. The airplane cooling system as defined in claim 1 wherein said circulating means are a plurality of openings in a common wall between said cold air and cooling chambers, and said regulating means include at least one valve for regulating the air circulation through at least one of said openings.

10. The airplane cooling system as defined in claim 9 wherein said circulating means includes a fan.

11. The airplane cooling system as defined in claim 9 including means for insulating said cooling chamber relative to said cold air chamber, and said insulating means include a common insulated wall between said cold air and cooling chambers.

12. The airplane cooling system as defined in claim 1 wherein said circulating means are a plurality of ducts between said cold air and cooling chambers, and said regulating means include at least one valve for regulating the air circulation through at least one of said ducts.

13. The airplane cooling system as defined in claim 12 wherein said circulating means includes a fan.

14. The airplane cooling system as defined in claim 1 wherein said circulating means includes a fan.

15. The airplane cooling system as defined in claim 1 including means for insulating said cooling chamber relative to said cold air chamber.

16. The airplane cooling system as defined in claim 1 including means for insulating said cooling chamber relative to said cold air chamber and said passenger compartment.

17. The airplane cooling system as defined in claim 1 including means for insulating said cooling chamber relative to said cold air chamber, and said insulating means include a common insulated wall between said cold air and cooling chambers.

18. The airplane cooling system as defined in claim 8 wherein said cooling chamber is sized to accommodate at least one passenger serving trolley.

19. The airplane cooling system as defined in claim 18 wherein said cooling chamber is sized to accommodate at least one passenger serving trolley, and at least one passenger serving trolley in said cooling compartment.

20. The airplane system as defined in claim 8 including means in said cooling chamber for accumulating cold during inflight conditions.

* * * * *